(12) United States Patent
Yoshinaga

(10) Patent No.: US 9,841,586 B2
(45) Date of Patent: Dec. 12, 2017

(54) SINGLE FOCAL LENGTH LENS SYSTEM, INTERCHANGEABLE LENS APPARATUS, AND CAMERA SYSTEM

(71) Applicant: Panasonic Intellectual Property Management Co., Ltd., Osaka (JP)

(72) Inventor: Shunichiro Yoshinaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 10 days.

(21) Appl. No.: 15/233,146

(22) Filed: Aug. 10, 2016

(65) Prior Publication Data

US 2017/0059832 A1 Mar. 2, 2017

(30) Foreign Application Priority Data

Aug. 31, 2015 (JP) ................................ 2015-169941
Jun. 10, 2016 (JP) ................................ 2016-115803

(51) Int. Cl.
| | | |
|---|---|---|
| G02B 9/00 | (2006.01) | |
| G02B 13/26 | (2006.01) | |
| G02B 27/00 | (2006.01) | |
| G02B 5/00 | (2006.01) | |
| G02B 9/64 | (2006.01) | |
| G02B 13/18 | (2006.01) | |
| G02B 7/14 | (2006.01) | |

(52) U.S. Cl.
CPC ............. *G02B 13/26* (2013.01); *G02B 5/005* (2013.01); *G02B 7/14* (2013.01); *G02B 9/64* (2013.01); *G02B 13/18* (2013.01); *G02B 27/0025* (2013.01)

(58) Field of Classification Search
CPC ....................................................... G02B 13/04
USPC .......................................................... 359/740
See application file for complete search history.

(56) References Cited

U.S. PATENT DOCUMENTS

2011/0164324 A1* 7/2011 Okumura ............... G02B 13/06
                                                              359/682
2013/0033768 A1    2/2013 Sunaga et al.

FOREIGN PATENT DOCUMENTS

JP    2012-242472    12/2012
JP    2013-37080     2/2013

* cited by examiner

*Primary Examiner* — James Jones
(74) *Attorney, Agent, or Firm* — Wenderoth, Lind & Ponack, L.L.P.

(57) ABSTRACT

A single focal length lens system includes, in order from an object side to an image side, a first lens unit having positive optical power and a second lens unit including a lens element that moves in a direction of an optical axis with respect to an image surface in focusing from an infinity in-focus condition to a close-object in-focus condition. The first lens unit includes an aperture diaphragm and a lens element A located on the object side of the aperture diaphragm. A lens element B having positive optical power and a lens element C having negative optical power are located on the image side of the aperture diaphragm. Abbe numbers of the lens elements A, B, and C to the d-line and partial dispersion ratios of the lens elements A, B, and C for the g-line and the F-line satisfy a predetermined relation.

8 Claims, 11 Drawing Sheets

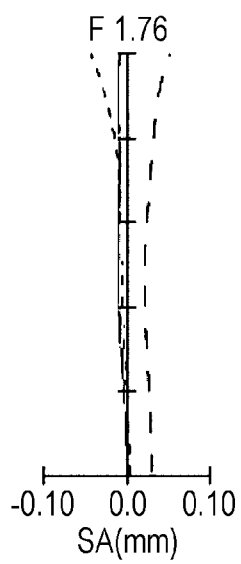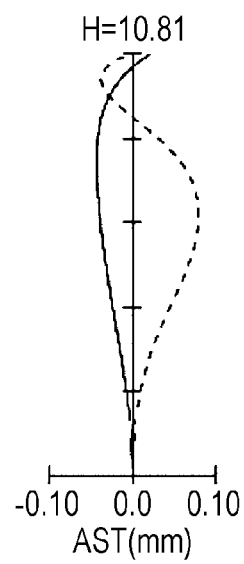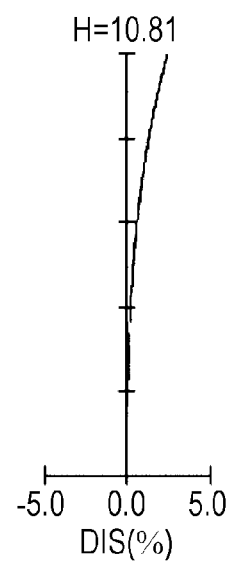

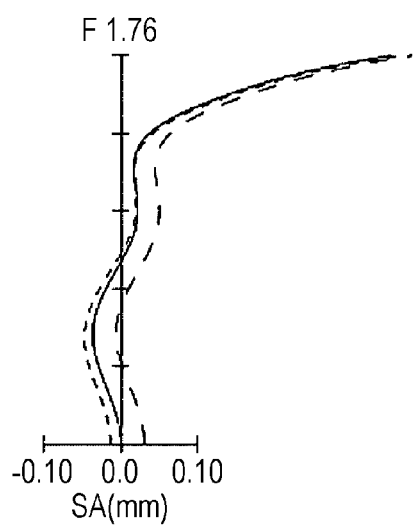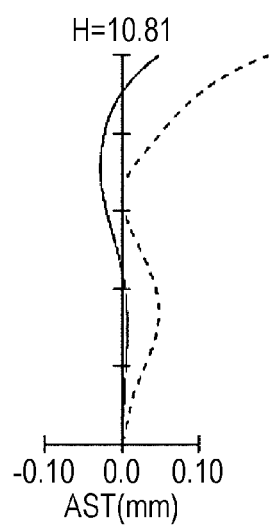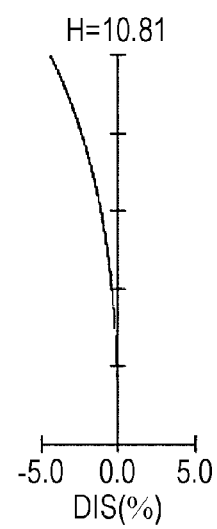

SINGLE FOCAL LENGTH LENS SYSTEM, INTERCHANGEABLE LENS APPARATUS, AND CAMERA SYSTEM

BACKGROUND

1. Technical Field

The present disclosure relates to a single focal length lens system, an interchangeable lens apparatus, and a camera system.

2. Description of Related Art

In recent years, interchangeable-lens type digital camera systems (also referred to simply as "camera systems", hereinafter) have been spreading rapidly. Such interchangeable-lens type digital camera systems make it possible to photograph a high-quality image with high sensitivity, to enable high-speed focusing and high-speed image processing after the photographing, and to enable easy replacement of an interchangeable lens apparatus in accordance with a desired scene.

Conventionally, there has been a demand for a lens system which is compact and has high optical performance as a lens system used in an interchangeable lens apparatus. For example, various lens systems having a three-unit configuration have been proposed.

Unexamined Japanese Patent Publication Nos. 2012-242472 and 2013-037080 disclose a lens system having positive-negative-positive three-unit configuration. In this lens system, an aperture diaphragm is disposed in the first lens unit, and focusing is performed using the second lens unit.

SUMMARY

The present disclosure provides a single focal length lens system that sufficiently corrects various aberrations including chromatic aberration and has high optical performance even at a peripheral section. The present disclosure also provides an interchangeable lens apparatus and a camera system which are compact, have high performance, and include the single focal length lens system.

A single focal length lens system according to the present disclosure includes, in order from an object side to an image side, a first lens unit having positive optical power and a second lens unit including a lens element that moves in a direction of an optical axis with respect to an image surface in focusing from an infinity in-focus condition to a close-object in-focus condition. The first lens unit includes an aperture diaphragm and a lens element A located on the object side of the aperture diaphragm. A lens element B having positive optical power and a lens element C having negative optical power are located on the image side of the aperture diaphragm. The following conditions (1) to (3) are satisfied.

$$0.647 < P_gF_A + 0.0018 \times vd_A < 0.75 \quad (1)$$

$$0.647 < P_gF_B + 0.0018 \times vd_B < 0.75 \quad (2)$$

$$0.647 < P_gF_C + 0.0018 \times vd_C < 0.75 \quad (3)$$

where
- $vd_A$: an Abbe number of the lens element A to the d-line,
- $vd_B$: an Abbe number of the lens element B to the d-line,
- $vd_C$: an Abbe number of the lens element C to the d-line,
- $P_gF_A$: a partial dispersion ratio of the lens element A for the g-line and the F-line,
- $P_gF_B$: a partial dispersion ratio of the lens element B for the g-line and the F-line, and
- $P_gF_C$: a partial dispersion ratio of the lens element C for the g-line and the F-line.

An interchangeable lens apparatus according to the present disclosure includes the single focal length lens system, and a lens mount section that is connectable to a camera body including an imaging device which receives an optical image formed by the single focal length lens system and converts the optical image into an electric image signal.

A camera system according to the present disclosure includes an interchangeable lens apparatus including the single focal length lens system, and a camera body that is detachably connected to the interchangeable lens apparatus through a camera mount section and includes an imaging device which receives an optical image formed by the single focal length lens system and converts the optical image into an electric image signal.

BRIEF DESCRIPTION OF DRAWINGS

FIG. 2A is a longitudinal aberration diagram of the single focal length lens system in an infinity in-focus condition according to Numerical Example 1;

FIG. 2B is a longitudinal aberration diagram of the single focal length lens system in an infinity in-focus condition according to Numerical Example 1;

FIG. 2C is a longitudinal aberration diagram of the single focal length lens system in an infinity in-focus condition according to Numerical Example 1;

FIG. 8A is a longitudinal aberration diagram of the single focal length lens system in an infinity in-focus condition according to Numerical Example 4;

FIG. 8B is a longitudinal aberration diagram of the single focal length lens system in an infinity in-focus condition according to Numerical Example 4;

FIG. 8C is a longitudinal aberration diagram of the single focal length lens system in an infinity in-focus condition according to Numerical Example 4;

DETAILED DESCRIPTION

Hereinafter, exemplary embodiments will be described in detail with reference to the accompanying drawings. It is noted, however, that descriptions in more detail than necessary will sometimes be omitted. For example, detailed descriptions of well-known items and duplicate descriptions of substantially the same configuration will sometimes be omitted. This is intended to avoid unnecessary redundancy in the following description, and to facilitate understanding of those skilled in the art.

Note that the inventor provides the accompanying drawings and the following descriptions so as to facilitate fully understanding of the present disclosure by those skilled in the art, and the accompanying drawings and the following descriptions are not intended to limit the subject matter defined by the claims.

In the present disclosure, a lens unit is a unit including at least one lens element, and optical power, a composite focal length, and the like are determined for each lens unit according to the type, the number, the arrangement, and the like of lens elements constituting the lens unit.

First to Fifth Exemplary Embodiments

FIGS. 1, 3, 5, 7, and 9 are each a lens arrangement diagram of a single focal length lens system according to each of the first to fifth exemplary embodiments, and each diagram illustrates the single focal length lens system in an infinity in-focus condition.

The direction of the arrow attached to each lens unit in each diagram indicates focusing from an infinity in-focus condition to a close-object in-focus condition. That is, the arrow indicates a direction along which second lens unit G2 described below moves in focusing from an infinity in-focus condition to a close-object in-focus condition.

In each diagram, an asterisk "*" attached to a specific surface indicates that this surface is aspheric. Further, in each diagram, symbols (+) and (−) attached to the reference symbol of each lens unit corresponds to the sign of the optical power of each lens unit. In addition, a straight line at the rightmost side in each diagram indicates a position of image surface S.

Each of the single focal length lens systems according to the first to fifth exemplary embodiments includes, in order from an object side to an image side, first lens unit G1 having positive optical power, second lens unit G2 having negative optical power, and third lens unit G3 having positive optical power. Further, aperture diaphragm P is provided in first lens unit G1.

First Exemplary Embodiment

Figure 1:
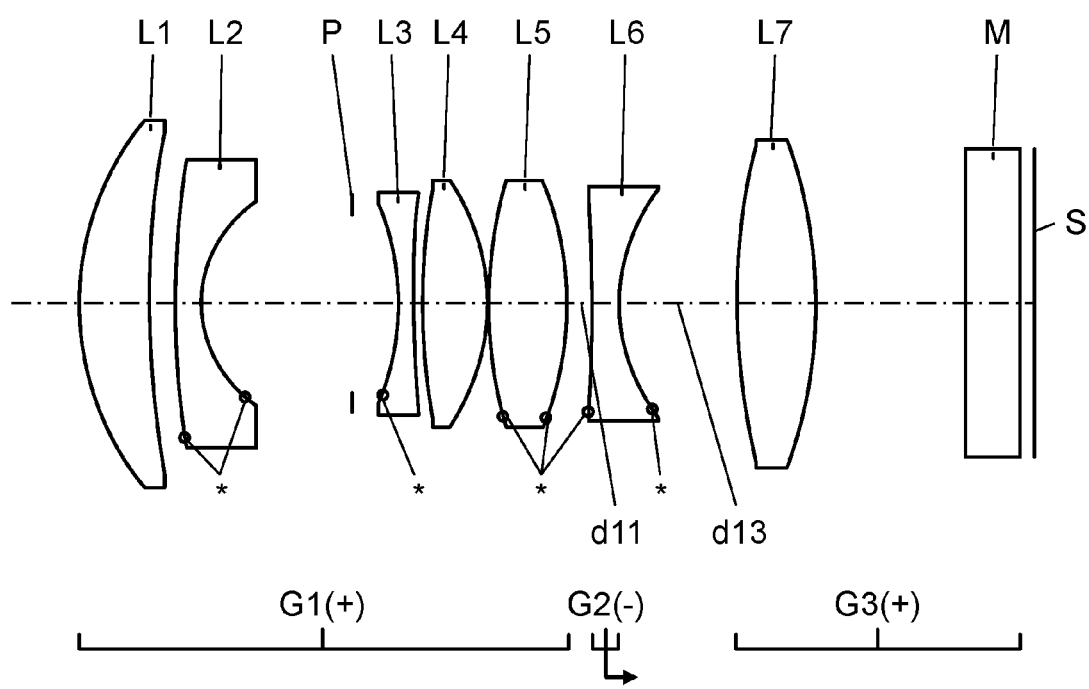
FIG. 1 is a lens arrangement diagram of a single focal length lens system in an infinity in-focus condition according to a first exemplary embodiment (Numerical Example 1)

As illustrated in FIG. 1, first lens unit G1 includes, in order from an object side to an image side, positive meniscus first lens element L1 with a convex surface facing the object side, negative meniscus second lens element L2 with a convex surface facing the object side, aperture diaphragm P, biconcave third lens element L3, biconvex fourth lens element L4, and biconvex fifth lens element L5. Both surfaces of second lens element L2 at the object side and the image side are aspheric, the surface of the third lens element L3 at the object side is aspheric, and both surfaces of the fifth lens element L5 at the object side and the image side are aspheric.

Second lens unit G2 only includes biconcave sixth lens element L6. Both surfaces of sixth lens element L6 at the object side and the image side are aspheric.

Third lens unit G3 includes biconvex seventh lens element L7 and plane parallel plate M.

In focusing from an infinity in-focus condition to a close-object in-focus condition, first lens unit G1 and third lens unit G3 are fixed with respect to image surface S, while second lens unit G2 which is a focusing lens unit moves to the image side along an optical axis.

First lens element L1 and second lens element L2 are one example of lens element A, fifth lens element L5 is one example of lens element B, and sixth lens element L6 is one example of lens element C.

Second Exemplary Embodiment

Figure 3:
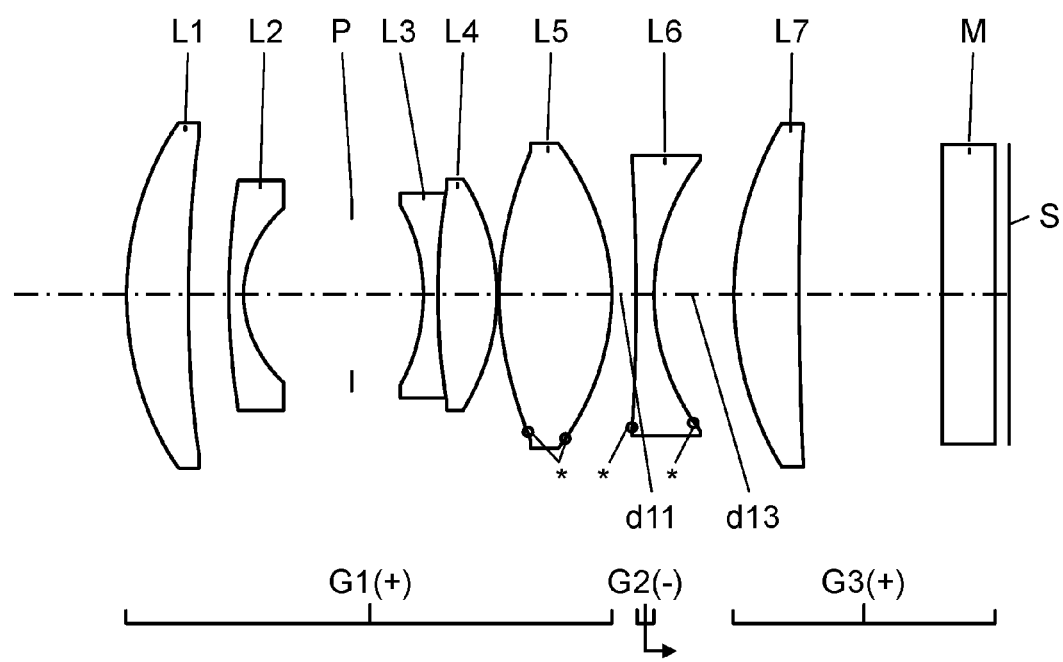
FIG. 3 is a lens arrangement diagram of a single focal length lens system in an infinity in-focus condition according to a second exemplary embodiment (Numerical Example 2)
Figure 4A:
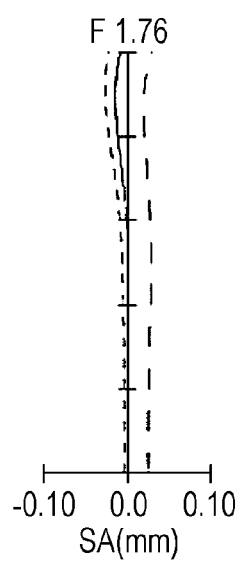
FIG. 4A is a longitudinal aberration diagram of the single focal length lens system in an infinity in-focus condition according to Numerical Example 2.
Figure 4B:
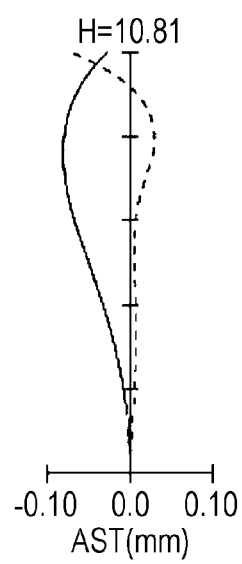
FIG. 4B is a longitudinal aberration diagram of the single focal length lens system in an infinity in-focus condition according to Numerical Example 2.
Figure 4C:
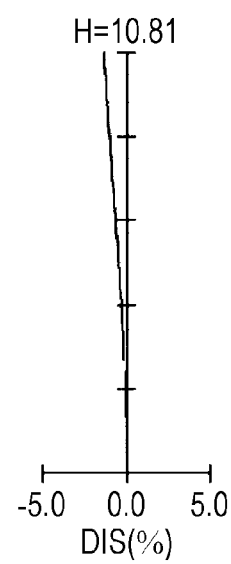
FIG. 4C is a longitudinal aberration diagram of the single focal length lens system in an infinity in-focus condition according to Numerical Example 2.

As illustrated in FIG. 3, first lens unit G1 includes, in order from an object side to an image side, positive meniscus first lens element L1 with a convex surface facing the object side, negative meniscus second lens element L2 with a convex surface facing the object side, aperture diaphragm P, biconcave third lens element L3, biconvex fourth lens element L4, and biconvex fifth lens element L5. Third lens element L3 and fourth lens element L4 out of these elements are cemented to each other. Both surfaces of fifth lens element L5 at the object side and the image side are aspheric.

Second lens unit G2 only includes biconcave sixth lens element L6. Both surfaces of sixth lens element L6 at the object side and the image side are aspheric.

Third lens unit G3 includes positive meniscus seventh lens element L7 with a convex surface facing the object side, and plane parallel plate M.

In focusing from an infinity in-focus condition to a close-object in-focus condition, first lens unit G1 and third lens unit G3 are fixed with respect to image surface S, while second lens unit G2 which is a focusing lens unit moves to the image side along an optical axis.

First lens element L1 and second lens element L2 are one example of lens element A, fifth lens element L5 is one example of lens element B, and sixth lens element L6 is one example of lens element C.

Third Exemplary Embodiment

Figure 5:
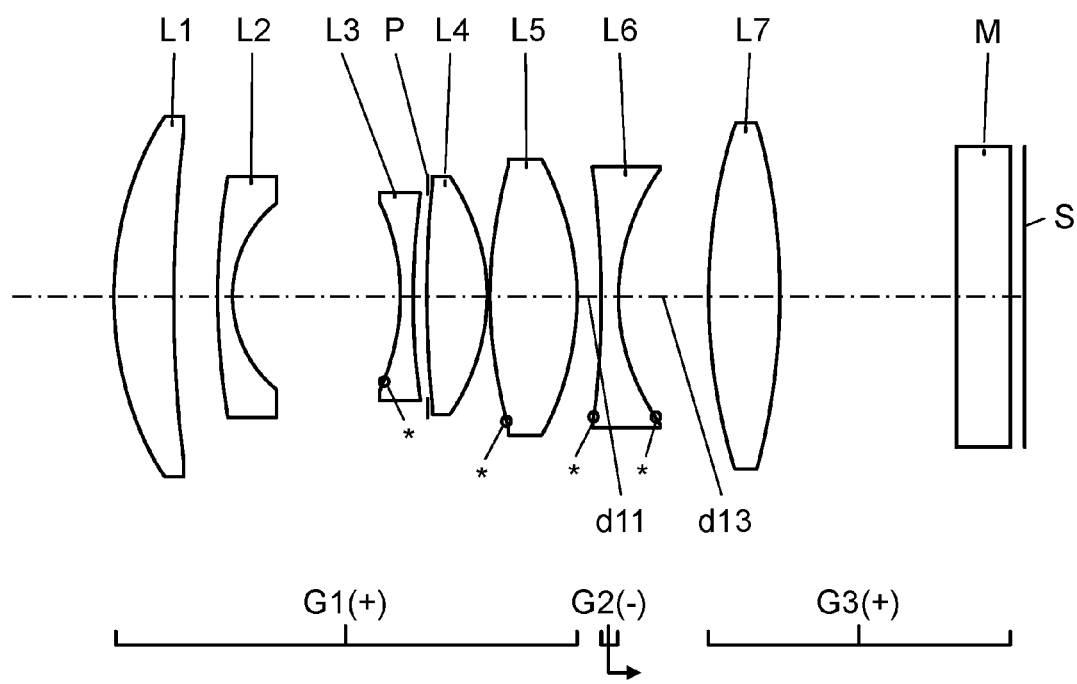
FIG. 5 is a lens arrangement diagram of a single focal length lens system in an infinity in-focus condition according to a third exemplary embodiment (Numerical Example 3)
Figure 6A:
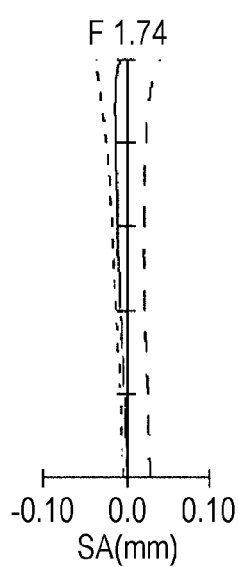
FIG. 6A is a longitudinal aberration diagram of the single focal length lens system in an infinity in-focus condition according to Numerical Example 3.
Figure 6B:
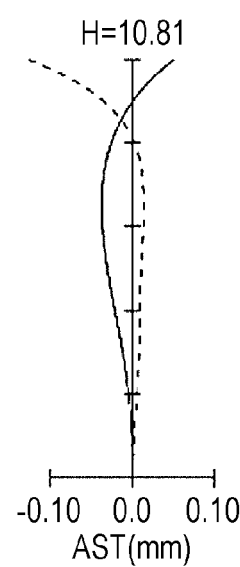
FIG. 6B is a longitudinal aberration diagram of the single focal length lens system in an infinity in-focus condition according to Numerical Example 3.
Figure 6C:
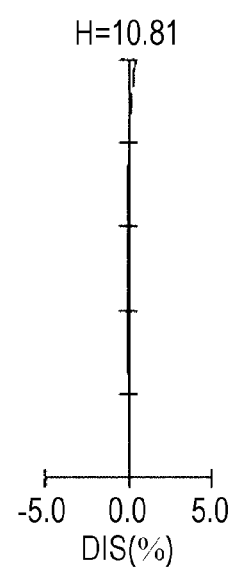
FIG. 6C is a longitudinal aberration diagram of the single focal length lens system in an infinity in-focus condition according to Numerical Example 3.

As illustrated in FIG. 5, first lens unit G1 includes, in order from an object side to an image side, positive meniscus first lens element L1 with a convex surface facing the object side, negative meniscus second lens element L2 with a convex surface facing the object side, biconcave third lens element L3, aperture diaphragm P, biconvex fourth lens element L4, and biconvex fifth lens element L5. The surface of third lens element L3 at the object side is aspheric, and the surface of fifth lens element L5 at the object side is aspheric.

Second lens unit G2 only includes biconcave sixth lens element L6. Both surfaces of sixth lens element L6 at the object side and the image side are aspheric.

Third lens unit G3 includes biconvex seventh lens element L7 and plane parallel plate M.

In focusing from an infinity in-focus condition to a close-object in-focus condition, first lens unit G1 and third lens unit G3 are fixed with respect to image surface S, while second lens unit G2 which is a focusing lens unit moves to the image side along an optical axis.

At least one of first lens element L1, second lens element L2, and third lens element L3 is one example of lens element A, fifth lens element L5 is one example of lens element B, and sixth lens element L6 is one example of lens element C.

Fourth Exemplary Embodiment

Figure 7:
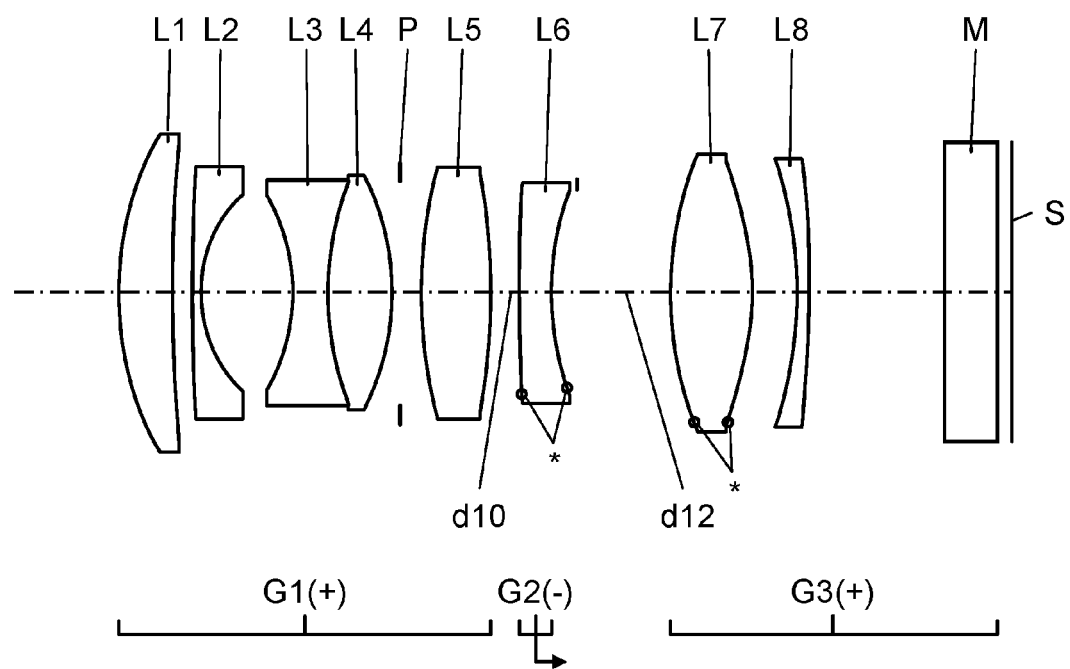
FIG. 7 is a lens arrangement diagram of a single focal length lens system in an infinity in-focus condition according to a fourth exemplary embodiment (Numerical Example 4)

As illustrated in FIG. 7, first lens unit G1 includes, in order from an object side to an image side, positive meniscus first lens element L1 with a convex surface facing the object side, negative meniscus second lens element L2 with a convex surface facing the object side, biconcave third lens element L3, biconvex fourth lens element L4, aperture diaphragm P, and biconvex fifth lens element L5. Third lens element L3 and fourth lens element L4 out of these elements are cemented to each other.

Second lens unit G2 only includes biconcave sixth lens element L6. Both surfaces of sixth lens element L6 at the object side and the image side are aspheric.

Third lens unit G3 includes, in order from the object side to the image side, biconvex seventh lens element L7, negative meniscus eighth lens element L8 with a convex surface facing the object side, and plane parallel plate M. Both surfaces of seventh lens element L7 at the object side and the image side are aspheric.

In focusing from an infinity in-focus condition to a close-object in-focus condition, first lens unit G1 and third lens unit G3 are fixed with respect to image surface S, while second lens unit G2 which is a focusing lens unit moves to the image side along an optical axis.

At least one of first lens element L1, second lens element L2, third lens element L3, and fourth lens element L4 is one example of lens element A, seventh lens element L7 is one example of lens element B, and sixth lens element L6 is one example of lens element C.

Fifth Exemplary Embodiment

Figure 9:
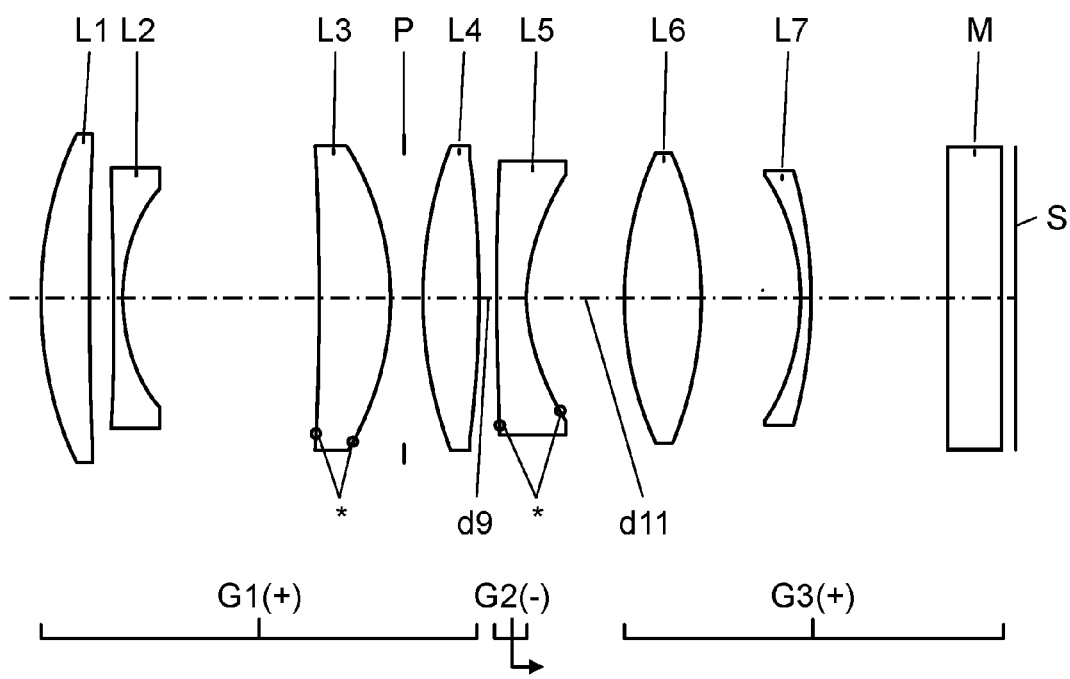
FIG. 9 is a lens arrangement diagram of a single focal length lens system in an infinity in-focus condition according to a fifth exemplary embodiment (Numerical Example 5)
Figure 10A:
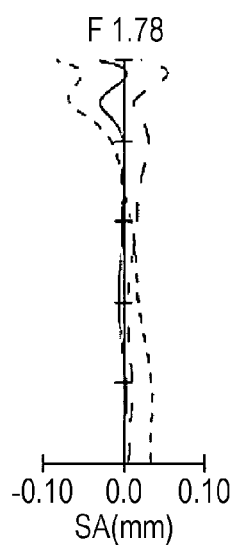
FIG. 10A is a longitudinal aberration diagram of the single focal length lens system in an infinity in-focus condition according to Numerical Example 5.
Figure 10B:
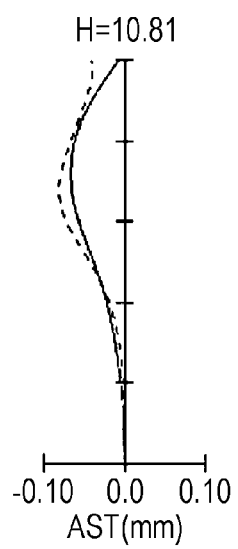
FIG. 10B is a longitudinal aberration diagram of the single focal length lens system in an infinity in-focus condition according to Numerical Example 5.
Figure 10C:
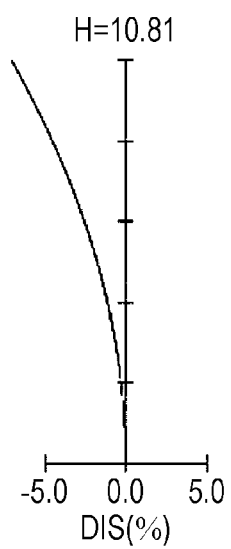
FIG. 10C is a longitudinal aberration diagram of the single focal length lens system in an infinity in-focus condition according to Numerical Example 5.

As illustrated in FIG. 9, first lens unit G1 includes, in order from an object side to an image side, positive meniscus first lens element L1 with a convex surface facing the object side, biconcave second lens element L2, positive meniscus third lens element L3 with a convex surface facing the image side, aperture diaphragm P, and biconvex fourth lens element L4. Both surfaces of third lens element L3 at the object side and the image side are aspheric.

Second lens unit G2 only includes negative meniscus fifth lens element L5 with a convex surface facing the object side. Both surfaces of fifth lens element L5 at the object side and the image side are aspheric.

Third lens unit G3 includes, in order from the object side to the image side, biconvex sixth lens element L6, and negative meniscus seventh lens element L7 with a convex surface facing the image side.

In focusing from an infinity in-focus condition to a close-object in-focus condition, first lens unit G1 and third lens unit G3 are fixed with respect to image surface S, while second lens unit G2 which is a focusing lens unit moves to the image side along an optical axis.

At least one of first lens element L1, second lens element L2, and third lens element L3 is one example of lens element A, sixth lens element L6 is one example of lens element B, and fifth lens element L5 is one example of lens element C.

The single focal length lens systems according to the first to fifth exemplary embodiments include aperture diaphragm P, lens element A provided on the object side of aperture diaphragm P and having optical power, lens element B having positive optical power, and lens element C having negative optical power, the lens element B and the lens element C being provided on the image side of aperture diaphragm P, thereby being capable of satisfactorily correcting chromatic aberration at a peripheral section.

In the single focal length lens systems according to the first to fifth exemplary embodiments, lens element B and lens element C are provided adjacent to each other in the optical axis direction, whereby on-axis chromatic aberration and magnification chromatic aberration can satisfactorily be corrected.

In the single focal length lens systems according to the first to fifth exemplary embodiments, the focusing lens unit, which includes at least one lens element and serves as a second sub-lens unit, in second lens unit G2 includes one lens element D having negative optical power, whereby variation in aberration according to a focusing distance is small, and high-speed focusing is easily implemented due to the light weight of the focusing lens unit.

The first to fifth exemplary embodiments have been described above as illustrative examples of the technology disclosed in the present application. However, the technology in the present disclosure is not limited to these exemplary embodiments, and can be applied to exemplary embodiments in which various changes, replacements, additions, and omissions are made.

Conditions that a single focal length lens system like the single focal length lens systems according to the first to fifth exemplary embodiments can satisfy will be described below. Notably, a plurality of possible conditions are specified for the single focal length lens system according to each exemplary embodiment, and the configuration of a single focal length lens system satisfying all of the plurality of conditions is the most effective. However, it is possible to obtain a single focal length lens system which satisfies an individual condition to provide the effect corresponding to the individual condition.

For example, a single focal length lens system includes, in order from an object side to an image side, a first lens unit having positive optical power and a second lens unit including one lens element that moves in a direction of an optical axis with respect to an image surface in focusing from an infinity in-focus condition to a close-object in-focus condition, like the single focal length lens systems according to the first to fifth exemplary embodiments. The first lens unit includes an aperture diaphragm and lens element A disposed on the object side of the aperture diaphragm, and lens element B having positive optical power and lens element C having negative optical power are disposed on the image side of the aperture diaphragm. The single focal length lens system having the above configuration (this lens configuration is referred to as a basic configuration of exemplary embodiments hereinafter) satisfies the following conditions (1) to (3).

$$0.647 < P_gF_A + 0.0018 \times vd_A < 0.75 \quad (1)$$

$$0.647 < P_gF_B + 0.0018 \times vd_B < 0.75 \quad (2)$$

$$0.647 < P_gF_C + 0.0018 \times vd_C < 0.75 \quad (3)$$

where
$vd_A$: an Abbe number of the lens element A to the d-line,
$vd_B$: an Abbe number of the lens element B to the d-line,
$vd_C$: an Abbe number of the lens element C to the d-line,
$P_gF_A$: a partial dispersion ratio of the lens element A for the g-line and the F-line,
$P_gF_B$ a partial dispersion ratio of the lens element B for the g-line and the F-line, and
$P_gF_C$: a partial dispersion ratio of the lens element C for the g-line and the F-line.

Conditions (1) to (3) specify the partial dispersion ratios of lens elements A to C. When the ratio becomes less than the lower limit of the conditions (1) to (3), the correction of chromatic aberration by lens elements A to C becomes excessive, which may result in unsatisfactory correction of chromatic aberration. When the ratio exceeds the upper limit of conditions (1) to (3), the correction of chromatic aberration by lens element I becomes insufficient, which may result in insufficient correction of chromatic aberration.

When at least one of the following conditions (1)'-1, (1)'-2, (1)"-1, and (1)"-2 is satisfied, the above effect can be achieved more successfully.

$$0.650 < P_gF_A + 0.0018 \times vd_A \quad (1)'\text{-}1$$

$$P_gF_A + 0.0018 \times vd_A < 0.70 \quad (1)'\text{-}2$$

$$0.660 < P_gF_A + 0.0018 \times vd_A \quad (1)''\text{-}1$$

$$P_gF_A + 0.0018 \times vd_A < 0.67 \quad (1)''\text{-}2$$

When at least one of the following conditions (2)'-1, (2)'-2, (2)"-1, and (2)"-2 is satisfied, the above effect can be achieved more successfully.

$$0.650 < P_gF_B + 0.0018 \times vd_B \quad (2)'\text{-}1$$

$$P_gF_B + 0.0018 \times vd_B < 0.70 \quad (2)'\text{-}2$$

$$0.660 < P_gF_B + 0.0018 \times vd_B \quad (2)''\text{-}1$$

$$P_gF_B + 0.0018 \times vd_B < 0.67 \quad (2)''\text{-}2$$

When at least one of the following conditions (3)'-1, (3)'-2, (3)"-1, and (3)"-2 is satisfied, the above effect can be achieved more successfully.

$$0.650 < P_gF_C + 0.0018 \times vd_C \quad (3)'\text{-}1$$

$$P_gF_C + 0.0018 \times vd_C < 0.70 \quad (3)'\text{-}2$$

$$0.660 < P_gF_C + 0.0018 \times vd_C \quad (3)''\text{-}1$$

$$P_gF_C + 0.0018 \times vd_C < 0.67 \quad (3)''\text{-}2$$

For example, it is beneficial that the single focal length lens system having the basic configuration and including lens element B, like the single focal length lens systems according to the first to fifth exemplary embodiments, satisfies the following condition (4).

$$-0.5 < (R1_B + R2_B)/(R1_B - R2_B) < 1.0 \quad (4)$$

where
$R1_B$: a radius of curvature of the surface of lens element B at the object side, and
$R2_B$: a radius of curvature of the surface of lens element B at the image side.

Condition (4) specifies the shape factor of lens element B. When the value becomes lower than the lower limit of condition (4) or exceeds the upper limit of condition (4), aberration of ray passing near the effective diameter of lens element B increases. With this, spherical aberration and a curvature of field are likely to occur, which may result in deterioration in focusing performance.

When at least one of the following conditions (4)'-1, (4)'-2, (4)"-1, and (4)"-2 is satisfied, the above effect can be achieved more successfully.

$$-0.2 < (R1_B + R2_B)/(R1_B - R2_B) \quad (4)'\text{-}1$$

$$(R1_B + R2_B)/(R1_B - R2_B) < 0.5 \quad (4)'\text{-}2$$

$$0.15 < (R1_B + R2_B)/(R1_B - R2_B) \quad (4)''\text{-}1$$

$$(R1_B + R2_B)/(R1_B - R2_B) < 0.25 \quad (4)''\text{-}2$$

For example, it is beneficial that the single focal length lens system having the basic configuration and including lens element C, like the single focal length lens systems according to the first to fifth exemplary embodiments, satisfies the following condition (5).

$$0.2 < (R1_C + R2_C)/(R1_C - R2_C) < 3.0 \quad (5)$$

where
$R1_C$: a radius of curvature of the surface of lens element C at the object side, and
$R2_C$: a radius of curvature of the surface of lens element C at the image side.

Condition (5) specifies the shape factor of lens element C. When the value becomes lower than the lower limit of condition (5) or exceeds the upper limit of condition (5), aberration of ray passing near the effective diameter of lens element B increases. With this, spherical aberration and a curvature of field are likely to occur, which may result in deterioration in focusing performance.

When at least one of the following conditions (5)'-1, (5)'-2, (5)"-1, and (5)"-2 is satisfied, the above effect can be achieved more successfully.

$$0.6 < (R1_C + R2_C)/(R1_C - R2_C) \quad (5)'\text{-}1$$

$$(R1_C + R2_C)/(R1_C - R2_C) < 2.2 \quad (5)'\text{-}2$$

$$1.0 < (R1_C + R2_C)/(R1_C - R2_C) \quad (5)''\text{-}1$$

$$(R1_C + R2_C)/(R1_C - R2_C) < 1.3 \quad (5)''\text{-}2$$

For example, it is beneficial that the single focal length lens system having the basic configuration, like the single focal length lens systems according to the first to fifth exemplary embodiments, satisfies the following condition (6).

$$0.3 < |f_B/f_C| < 2.5 \quad (6)$$

where
$f_B$: a focal length of lens element B, and
$f_C$: a focal length of lens element C.

Condition (6) specifies a ratio of the focal length of lens element B and the focal length of lens element C. When the ratio becomes lower than the lower limit of condition (6) or exceeds the upper limit of condition (6), the relation between the compensation of chromatic aberration generated on lens element B and the compensation of chromatic aberration generated on lens element C deteriorates. Thus, focusing performance might deteriorate.

When at least one of the following conditions (6)'-1, (6)'-2, (6)"-1, and (6)"-2 is satisfied, the above effect can be achieved more successfully.

$$0.4 < |f_B/f_C| \tag{6)'-1}$$

$$|f_B/f_C| < 1.6 \tag{6)'-2}$$

$$0.48 < |f_B/f_C| \tag{6)''-1}$$

$$|f_B/f_C| < 0.57 \tag{6)''-2}$$

For example, it is beneficial that the single focal length lens system having the basic configuration and including a focusing lens unit which includes one lens element D having negative optical power, like the single focal length lens systems according to the first to fifth exemplary embodiments, satisfies the following condition (7).

$$0.2 < |f_W/f_D| < 3.0 \tag{7}$$

where $f_W$: a focal length of the entire system in an infinity in-focus condition, and $f_D$: a focal length of lens element D.

In the first to fifth exemplary embodiments, lens element D is the same as lens element C described above.

Condition (7) specifies the focal length of lens element D. When the value becomes lower than the lower limit of condition (7), the amount of movement of the focusing lens is increased, which may lead to an increase in the total length of the entire lens system. When the value exceeds the upper limit of condition (7), large aberration occurs due to the focusing lens unit, so that the variation in aberration according to the focusing distance might be increased.

When at least one of the following conditions (7)'-1, (7)'-2, (7)"-1, and (7)"-2 is satisfied, the above effect can be achieved more successfully.

$$0.35 < |f_W/f_D| \tag{7)'-1}$$

$$|f_W/f_D| < 1.8 \tag{7)'-2}$$

$$0.50 < |f_W/f_D| \tag{7)''-1}$$

$$|f_W/f_D| < 0.6 \tag{7)''-2}$$

Each lens unit composing the single focal length lens systems according to the first to fifth exemplary embodiments may only include refractive lens element (specifically, a lens element of a type deflecting light on an interface between mediums having different refractive indices) deflecting incident ray with refraction. However, it is not limited thereto. For example, each lens unit may include a diffractive lens element which deflects incident ray with diffraction, a hybrid diffractive-refractive lens element which deflects incident ray with a combination of diffraction action and refraction action, or a gradient index lens element which deflects incident ray with gradual variation of the refractive index in a medium. In particular, when a diffraction structure is formed on the interface between mediums having different refractive indices in a hybrid diffractive-refractive lens element, wavelength dependency of diffraction efficiency can be enhanced. Thus, this is beneficial.

Sixth Exemplary Embodiment

Figure 11:
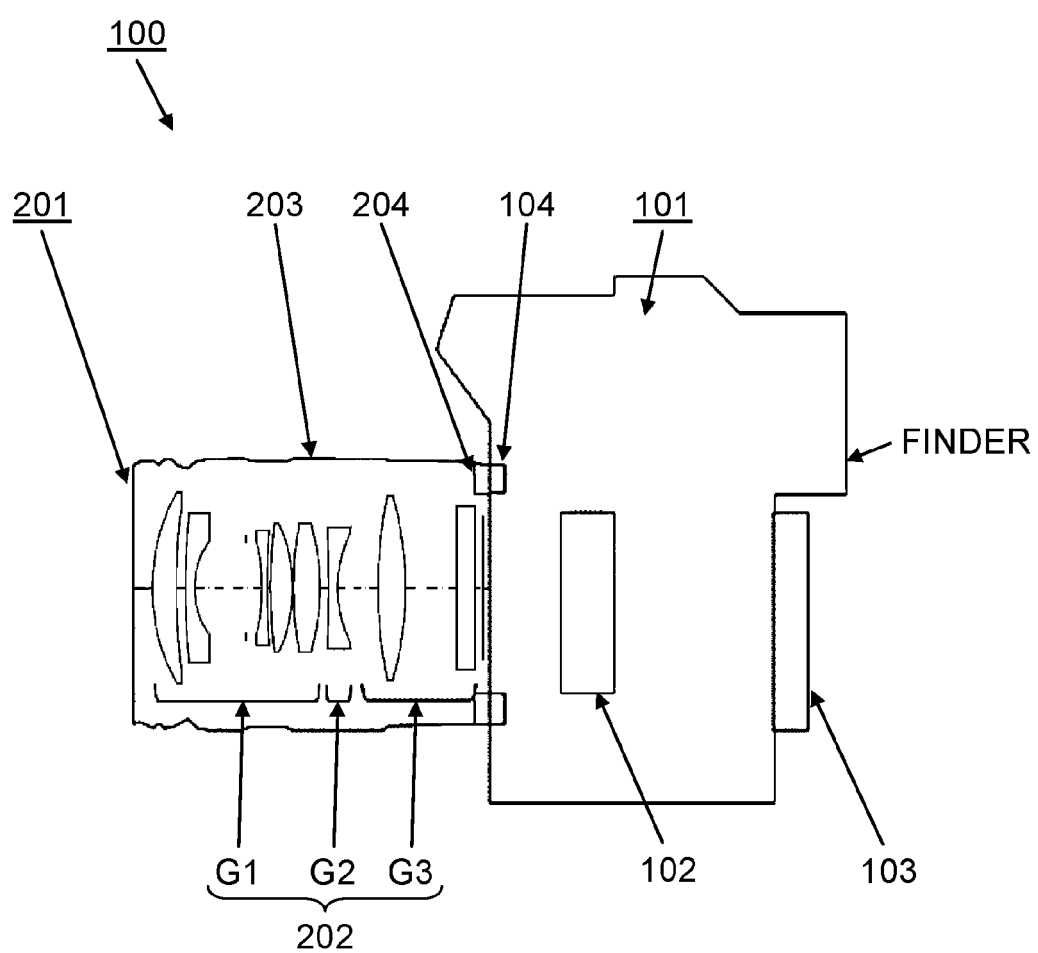
FIG. 11 is a schematic configuration diagram of an interchangeable-lens type digital camera system according to a sixth exemplary embodiment.

FIG. 11 is a schematic configuration diagram of an interchangeable-lens type digital camera system according to a sixth exemplary embodiment.

Camera system 100 according to the sixth exemplary embodiment includes camera body 101 and interchangeable lens apparatus 201 detachably connected to camera body 101.

Camera body 101 includes imaging device 102 that receives an optical image formed with single focal length lens system 202 of interchangeable lens apparatus 201 and converts the received optical image into an electric image signal, a liquid crystal monitor 103 that displays the image signal converted by imaging device 102, and camera mount section 104. On the other hand, interchangeable lens apparatus 201 includes single focal length lens system 202 according to any one of the first to fifth exemplary embodiments, lens barrel 203 holding single focal length lens system 202, and lens mount section 204 connected to camera mount section 104 of camera body 101. Camera mount section 104 and lens mount section 204 are physically connected to each other, and further, function as an interface that establishes electrical connection between a controller (not illustrated) mounted in camera body 101 and a controller (not illustrated) mounted in interchangeable lens apparatus 201 to enable mutual signal communication. FIG. 11 illustrates the case in which the single focal length lens system according to the first exemplary embodiment is used as single focal length lens system 202.

Since single focal length lens system 202 according to any one of the first to fifth exemplary embodiments is used in the sixth exemplary embodiment, a compact interchangeable lens apparatus having excellent focusing performance can be implemented at low cost. In addition, reduction in size and reduction in cost of entire camera system 100 according to the sixth exemplary embodiment can also be achieved.

The sixth exemplary embodiment has been described above as an illustrative example of the technology disclosed in the present application. However, the technology in the present disclosure is not limited to these exemplary embodiments, and can be applied to exemplary embodiments in which various changes, replacements, additions, and omissions are made.

Numerical Examples for specifically implementing the single focal length lens systems according to the first to fifth exemplary embodiments will be described below. In each Numerical Example, the units of length are all "mm", while the units of viewing angle are all "°" in each Table. Moreover, in each Numerical Example, r is a radius of curvature, d is an axial distance, and is a refractive index to the d-line, and vd is an Abbe number to the d-line.

Further, in each Numerical Example, nC is a refractive index to the C-line, nF is a refractive index to the F-line, and ng is a refractive index to the g-line. PgF is a partial dispersion ratio of the g-line and the F-line, and can be obtained from the following equation.

$$PgF = (ng - nF)/(nF - nC)$$

In addition, in each Numerical Example, the surface marked with * is aspheric. The aspheric shape is defined by the following equation.

$$z = \frac{h^2/r}{1 + \sqrt{1 - (1+\kappa)(h/r)^2}} + \sum A_n h^n \tag{Equation 1}$$

where

Z: a distance from a point on the aspheric surface with height h relative to an optical axis to a tangent plane at the vertex of the aspheric surface, h: a height relative to the optical axis,
r: a radius of curvature at the top,
κ: a conic constant, and
$A_n$: an nth-order aspheric coefficient.

FIGS. 2A, 2B, 2C, 4A, 4B, 4C, 6A, 6B, 6C, 8A, 8B, 8C, 10A, 10B, and 10C are longitudinal aberration diagrams of the single focal length lens systems according to Numerical Examples 1 to 5 in an infinity in-focus condition.

FIGS. 2A, 4A, 6A, 8A, and 10A show spherical aberration (SA(mm)). FIGS. 2B, 4B, 6B, 8B, and 10B show astigmatism (AST(mm)). FIGS. 2C, 4C, 6C, 8C, and 10C show distortion (DIS (%)). In each spherical aberration diagram, a vertical axis indicates F-number (indicated as F in each diagram), and the solid line, the short dash line, and the long dash line indicate the characteristics to the d-line, the F-line, and the C-line, respectively. In each astigmatism diagram, the vertical axis indicates an image height (indicated as H in each diagram), and the solid line and the dash line indicate characteristics to a sagittal plane (indicated as "s" in each diagram) and a meridional plane (indicated as "m" in each diagram), respectively. In each distortion diagram, the vertical axis indicates an image height (indicated as H in each diagram).

NUMERICAL EXAMPLE 1

The single focal length lens system according to Numerical Example 1 corresponds to the first exemplary embodiment illustrated in FIG. 1. Table 1 shows the surface data 1 of the single focal length lens system according to Numerical Example 1, Table 2 shows the surface data 2, Table 3 shows the aspherical data, Table 4 shows various data, Table 5 shows the single lens data, Table 6 shows the lens unit data, and Table 7 shows the lens unit magnification.

TABLE 1

(Surface data 1)

| Surface number | r | d | nd | vd |
|---|---|---|---|---|
| Object surface | ∞ | Variable | | |
| 1 | 21.82570 | 5.31700 | 1.90366 | 31.3 |
| 2 | 66.51370 | 2.05780 | | |
| 3* | 96.74280 | 2.00000 | 1.52996 | 55.8 |
| 4* | 9.12840 | 11.49760 | | |
| 5 (Diaphragm) | ∞ | 3.51470 | | |
| 6* | −25.38440 | 1.20000 | 1.63550 | 23.9 |
| 7 | 83.34490 | 0.72520 | | |
| 8 | 55.28840 | 4.88430 | 1.72916 | 54.7 |
| 9 | −17.10090 | 0.15000 | | |
| 10* | 35.67000 | 5.98630 | 1.52996 | 55.8 |
| 11* | −22.19540 | Variable | | |
| 12* | −149.80450 | 2.00000 | 1.63550 | 23.9 |
| 13* | 12.61840 | Variable | | |
| 14 | 48.71060 | 6.07790 | 1.84666 | 23.8 |
| 15 | −35.34990 | 11.43000 | | |
| 16 | ∞ | 4.20000 | 1.51680 | 64.2 |
| 17 | ∞ | BF | | |
| Image surface | ∞ | | | |

TABLE 2

(Surface data 2)

| Surface number | nC | nF | ng | PgF |
|---|---|---|---|---|
| Object surface | | | | |
| 1 | 1.89526 | 1.92412 | 1.94128 | 0.59467 |
| 2 | | | | |
| 3 | 1.52713 | 1.53662 | 1.54205 | 0.57218 |

TABLE 2-continued (Surface data 2)

| Surface number | nC | nF | ng | PgF |
|---|---|---|---|---|
| 4 | | | | |
| 5 (Diaphragm) | | | | |
| 6 | 1.62800 | 1.65460 | 1.67140 | 0.63158 |
| 7 | | | | |
| 8 | 1.72510 | 1.73844 | 1.74571 | 0.54521 |
| 9 | | | | |
| 10 | 1.52713 | 1.53662 | 1.54205 | 0.57218 |
| 11 | | | | |
| 12 | 1.62800 | 1.65460 | 1.67140 | 0.63158 |
| 13 | | | | |
| 14 | 1.83649 | 1.87209 | 1.89413 | 0.61908 |
| 15 | | | | |
| 16 | 1.51432 | 1.52237 | 1.52667 | 0.53418 |
| 17 | | | | |

TABLE 3

(Aspherical data)

Surface No. 3
K = 0.00000E+00, A4 = 1.95207E−05, A6 = −9.81210E−08, A8 = 2.71450E−10
A10 = 0.00000E+00, A12 = 0.00000E+00
Surface No. 4
K = 0.00000E+00, A4 = 1.69672E−06, A6 = 9.39629E−08, A8 = −5.08386E−09
A10 = 0.00000E+00, A12 = 0.00000E+00
Surface No. 6
K = 0.00000E+00, A4 = −1.15216E−04, A6 = 5.29641E−08, A8 = −2.99237E−10
A10 = 0.00000E+00, A12 = 0.00000E+00
Surface No. 10
K = 0.00000E+00, A4 = 1.38272E−05, A6 = −9.10686E−08, A8 = 1.02820E−09
A10 = −5.48203E−12, A12 = 0.00000E+00
Surface No. 11
K = 0.00000E+00, A4 = 1.72020E−05, A6 = 1.51350E−07, A8 = 0.00000E+00
A10 = 0.00000E+00, A12 = 0.00000E+00
Surface No. 12
K = 2.28019E−15, A4 = 6.80547E−06, A6 = −5.02168E−07, A8 = 4.09336E−09
A10 = −1.25341E−11, A12 = 2.28019E−15
Surface No. 13
K = −6.36846E−01, A4 = 2.38781E−05, A6 = −8.31023E−07, A8 = 6.38516E−09
A10 = −2.15468E−11, A12 = 0.00000E+00

TABLE 4

(Various data)

| | Infinity | 973 | 248 |
|---|---|---|---|
| Focal length | 25.8748 | 25.8727 | 25.6433 |
| F-number | 1.76015 | 1.76848 | 1.79547 |
| Viewing angle | 22.6837 | 22.6293 | 22.4573 |
| Image height | 10.8150 | 10.8150 | 10.8150 |
| Overall length of lens system | 72.9999 | 73.0140 | 72.9984 |
| BF | 1.00013 | 1.00018 | 1.00015 |
| d0 | ∞ | 900.0000 | 175.0000 |
| d11 | 1.9000 | 2.2645 | 3.6419 |
| d13 | 9.0590 | 8.7085 | 7.3155 |
| Entrance pupil position | 24.2227 | 24.2227 | 24.2227 |

TABLE 4-continued (Various data)

|  | Infinity | 973 | 248 |
|---|---|---|---|
| Exit pupil position | −305.2179 | −263.1768 | −167.9363 |
| Front principal point position | 47.9111 | 47.5545 | 45.8944 |
| Back principal point position | 47.1252 | 46.4150 | 43.9872 |

TABLE 5

(Single lens data)

| Lens | Initial surface | Focal length |
|---|---|---|
| 1 | 1 | 34.0270 |
| 2 | 3 | −19.1709 |
| 3 | 6 | −30.4877 |
| 4 | 8 | 18.4371 |
| 5 | 10 | 26.7764 |
| 6 | 12 | −18.2261 |
| 7 | 14 | 25.0236 |

TABLE 6

(Lens unit data)

| Lens unit | Initial surface | Focal length | Overall length of lens unit | Front principal point position | Back principal point position |
|---|---|---|---|---|---|
| 1 | 1 | 17.81257 | 37.33290 | 35.47462 | 36.56059 |
| 2 | 12 | −18.22608 | 2.00000 | 1.12249 | 1.90545 |
| 3 | 14 | 25.02360 | 21.70790 | 1.97260 | 6.07737 |

TABLE 7

(Lens unit magnification)

| Lens unit | Initial surface | Infinity | 973 | 248 |
|---|---|---|---|---|
| 1 | 1 | 0.00000 | −0.01941 | −0.09246 |
| 2 | 12 | 4.33097 | 4.31177 | 4.23532 |
| 3 | 14 | 0.33540 | 0.33540 | 0.33540 |

NUMERICAL EXAMPLE 2

The single focal length lens system according to Numerical Example 2 corresponds to the second exemplary embodiment illustrated in FIG. 3. Table 8 shows the surface data 1 of the single focal length lens system according to Numerical Example 2, Table 9 shows the surface data 2, Table 10 shows the aspherical data, Table 11 shows various data, Table 12 shows the single lens data, Table 13 shows the lens unit data, and Table 14 shows the lens unit magnification.

TABLE 8

(Surface data 1)

| Surface number | r | d | nd | vd |
|---|---|---|---|---|
| Object surface | ∞ | Variable | | |
| 1 | 25.02720 | 4.87800 | 1.90366 | 31.3 |
| 2 | 94.79720 | 3.17490 | | |
| 3 | 55.65910 | 1.20000 | 1.49700 | 81.6 |
| 4 | 8.91430 | 8.54800 | | |
| 5 (Diaphragm) | ∞ | 5.76680 | | |
| 6 | −14.43470 | 1.00000 | 1.75211 | 25.0 |
| 7 | 41.97300 | 4.82520 | 1.77250 | 49.6 |
| 8 | −16.89330 | 0.15000 | | |
| 9* | 22.00960 | 9.03320 | 1.52996 | 55.8 |
| 10* | −15.81130 | Variable | | |
| 11* | −86.95920 | 1.40000 | 1.63550 | 23.9 |
| 12* | 17.63200 | Variable | | |
| 13 | 25.93640 | 5.18220 | 1.94595 | 18.0 |
| 14 | 220.08890 | 11.43000 | | |
| 15 | ∞ | 4.20000 | 1.51680 | 64.2 |
| 16 | ∞ | BF | | |
| Image surface | ∞ | | | |

TABLE 9

(Surface data 2)

| Surface number | nC | nF | ng | PgF |
|---|---|---|---|---|
| Object surface | | | | |
| 1 | 1.89526 | 1.92412 | 1.94128 | 0.59467 |
| 2 | | | | |
| 3 | 1.49514 | 1.50123 | 1.50451 | 0.53875 |
| 4 | | | | |
| 5 (Diaphragm) | | | | |
| 6 | 1.74352 | 1.77355 | 1.79214 | 0.61909 |
| 7 | 1.76780 | 1.78336 | 1.79193 | 0.55025 |
| 8 | | | | |
| 9 | 1.52713 | 1.53662 | 1.54205 | 0.57218 |
| 10 | | | | |
| 11 | 1.62800 | 1.65460 | 1.67140 | 0.63158 |
| 12 | | | | |
| 13 | 1.93123 | 1.98383 | 2.01825 | 0.65443 |
| 14 | | | | |
| 15 | 1.51432 | 1.52237 | 1.52667 | 0.53418 |
| 16 | | | | |

TABLE 10

(Aspherical data)

Surface No. 9

K = 0.00000E+00, A4 = −2.86768E−05, A6 = −5.27238E−08, A8 = 5.67553E−11
A10 = −2.80993E−12, A12 = 0.00000E+00
Surface No. 10

K = 0.00000E+00, A4 = 6.69403E−05, A6 = −5.91281E−08, A8 = 0.00000E+00
A10 = 0.00000E+00, A12 = 0.00000E+00
Surface No. 11

K = 2.28019E−15, A4 = 5.73625E−06, A6 = 6.21066E−07, A8 = −7.51177E−09
A10 = 2.85176E−11, A12 = 2.28019E−15
Surface No. 12

K = 7.26541E−01, A4 = −2.96497E−05, A6 = 6.16921E−07, A8 = −7.30393E−09
A10 = 1.96498E−11, A12 = 0.00000E+00

TABLE 11

(Various data)

| | Infinity | 970 | 245 |
|---|---|---|---|
| Focal length | 24.2168 | 24.0471 | 23.3004 |
| F-number | 1.76129 | 1.76009 | 1.75371 |
| Viewing angle | 24.3618 | 24.4568 | 24.8092 |
| Image height | 10.8150 | 10.8150 | 10.8150 |
| Overall length of lens system | 70.0042 | 70.0051 | 70.0109 |
| BF | 1.01426 | 1.01502 | 1.01771 |
| d0 | ∞ | 900.0000 | 175.0000 |
| d10 | 1.9000 | 2.3133 | 3.8717 |
| d12 | 6.3016 | 5.8885 | 4.3332 |
| Entrance pupil position | 20.6816 | 20.6816 | 20.6816 |
| Exit pupil position | −148.8612 | −138.3937 | −108.7145 |
| Front principal point position | 40.9854 | 40.5618 | 38.9025 |
| Back principal point position | 45.7873 | 45.3271 | 43.8622 |

TABLE 12

(Single lens data)

| Lens | Initial surface | Focal length |
|---|---|---|
| 1 | 1 | 36.4213 |
| 2 | 3 | −21.5404 |
| 3 | 6 | −14.1731 |
| 4 | 7 | 16.1703 |
| 5 | 9 | 18.9282 |
| 6 | 11 | −22.9485 |
| 7 | 13 | 30.6832 |

TABLE 13

(Lens unit data)

| Lens unit | Initial surface | Focal length | Overall length of lens unit | Front principal point position | Back principal point position |
|---|---|---|---|---|---|
| 1 | 1 | 18.51518 | 38.57610 | 36.32860 | 38.47542 |
| 2 | 11 | −22.94845 | 1.40000 | 0.70802 | 1.25644 |
| 3 | 13 | 30.68317 | 20.81220 | −0.35120 | 3.63305 |

TABLE 14

(Lens unit magnification)

| Lens unit | Initial surface | Infinity | 970 | 245 |
|---|---|---|---|---|
| 1 | 1 | 0.00000 | −0.02017 | −0.09603 |
| 2 | 11 | 3.21318 | 3.19538 | 3.12832 |
| 3 | 13 | 0.40706 | 0.40703 | 0.40694 |

NUMERICAL EXAMPLE 3

The single focal length lens system according to Numerical Example 3 corresponds to the third exemplary embodiment illustrated in FIG. 5. Table 15 shows the surface data 1 of the single focal length lens system according to Numerical Example 3, Table 16 shows the surface data 2, Table 17 shows the aspherical data, Table 18 shows various data, Table 19 shows the single lens data, Table 20 shows the lens unit data, and Table 21 shows the lens unit magnification.

TABLE 15

(Surface data 1)

| Surface number | r | d | nd | vd |
|---|---|---|---|---|
| Object surface | ∞ | Variable | | |
| 1 | 26.34740 | 4.82410 | 1.90366 | 31.3 |
| 2 | 95.31930 | 3.50000 | | |
| 3 | 51.30700 | 1.20000 | 1.48749 | 70.4 |
| 4 | 9.22560 | 13.50000 | | |
| 5* | −19.43460 | 1.00000 | 1.63550 | 23.9 |
| 6 | 51.75270 | 1.16220 | | |
| 7 (Diaphragm) | ∞ | 0.00000 | | |
| 8 | 86.29710 | 4.82920 | 1.72916 | 54.7 |
| 9 | −15.83660 | 0.20000 | | |
| 10* | 32.54860 | 7.05470 | 1.53380 | 55.6 |
| 11 | −21.70610 | Variable | | |
| 12* | −90.79550 | 1.40000 | 1.63550 | 23.9 |
| 13* | 14.57300 | Variable | | |
| 14 | 42.24090 | 5.76770 | 1.92119 | 24.0 |
| 15 | −49.71390 | 14.25450 | | |
| 16 | ∞ | 4.20000 | 1.51680 | 64.2 |
| 17 | ∞ | BF | | |
| Image surface | ∞ | | | |

TABLE 16

(Surface data 2)

| Surface number | nC | nF | ng | PgF |
|---|---|---|---|---|
| Object surface | | | | |
| 1 | 1.89526 | 1.92412 | 1.94128 | 0.59467 |
| 2 | | | | |
| 3 | 1.48535 | 1.49227 | 1.49594 | 0.53049 |
| 4 | | | | |
| 5 | 1.62800 | 1.65460 | 1.67140 | 0.63158 |
| 6 | | | | |
| 7 (Diaphragm) | | | | |
| 8 | 1.72510 | 1.73844 | 1.74571 | 0.54521 |
| 9 | | | | |
| 10 | 1.53100 | 1.54060 | 1.54600 | 0.56232 |
| 11 | | | | |
| 12 | 1.62800 | 1.65460 | 1.67140 | 0.63158 |
| 13 | | | | |
| 14 | 1.91020 | 1.94865 | 1.97250 | 0.62010 |
| 15 | | | | |
| 16 | 1.51432 | 1.52237 | 1.52667 | 0.53418 |
| 17 | | | | |

TABLE 17

(Aspherical data)

Surface No. 5

K = 0.00000E+00, A4 = −7.66900E−05, A6 = 0.00000E+00, A8 = 0.00000E+00
A10 = 0.00000E+00
Surface No. 10

K = 0.00000E+00, A4 = −1.28009E−05, A6 = −8.00822E−08, A8 = 0.00000E+00
A10 = 0.00000E+00
Surface No. 12

K = 0.00000E+00, A4 = −6.90258E−06, A6 = −7.04833E−08, A8 = 3.07942E−10
A10 = −4.21582E−13
Surface No. 13

K = 0.00000E+00, A4 = −3.69945E−05, A6 = −1.61692E−07, A8 = −3.62657E−10
A10 = 0.00000E+00

TABLE 18

(Various data)

|  | Infinity | 973 | 248 |
|---|---|---|---|
| Focal length | 25.7099 | 25.6841 | 25.3688 |
| F-number | 1.73731 | 1.75106 | 1.79970 |
| Viewing angle | 22.8143 | 22.6065 | 21.8726 |
| Image height | 10.8150 | 10.8150 | 10.8150 |
| Overall length of lens system | 72.9997 | 73.0053 | 73.0024 |
| BF | 0.99974 | 0.99978 | 0.99978 |
| d0 | ∞ | 900.0000 | 175.0000 |
| d11 | 1.9000 | 2.3179 | 3.9020 |
| d13 | 7.2076 | 6.7952 | 5.2082 |
| Entrance pupil position | 29.2007 | 29.2007 | 29.2007 |
| Exit pupil position | −65.5789 | −63.5328 | −56.3758 |
| Front principal point position | 44.9825 | 44.5475 | 42.6578 |
| Back principal point position | 47.2899 | 46.6032 | 44.2866 |

TABLE 19

(Single lens data)

| Lens | Initial surface | Focal length |
|---|---|---|
| 1 | 1 | 38.9993 |
| 2 | 3 | −23.2913 |
| 3 | 5 | −22.1119 |
| 4 | 8 | 18.7246 |
| 5 | 10 | 25.5510 |
| 6 | 12 | −19.6585 |
| 7 | 14 | 25.5593 |

TABLE 20

(Lens unit data)

| Lens unit | Initial surface | Focal length | Overall length of lens unit | Front principal point position | Back principal point position |
|---|---|---|---|---|---|
| 1 | 1 | 19.28173 | 37.27020 | 35.74611 | 36.89902 |
| 2 | 12 | −19.65851 | 1.40000 | 0.73383 | 1.28222 |
| 3 | 14 | 25.55935 | 24.22220 | 1.42185 | 5.52532 |

TABLE 21

(Lens unit magnification)

| Lens unit | Initial surface | Infinity | 973 | 248 |
|---|---|---|---|---|
| 1 | 1 | 0.00000 | −0.02104 | −0.10071 |
| 2 | 12 | 5.81305 | 5.79211 | 5.71138 |
| 3 | 14 | 0.22938 | 0.22938 | 0.22938 |

NUMERICAL EXAMPLE 4

The single focal length lens system according to Numerical Example 4 corresponds to the fourth exemplary embodiment illustrated in FIG. 7. Table 22 shows the surface data 1 of the single focal length lens system according to Numerical Example 4, Table 23 shows the surface data 2, Table 24 shows the aspherical data, Table 25 shows various data, Table 26 shows the single lens data, Table 27 shows the lens unit data, and Table 28 shows the lens unit magnification.

TABLE 22

(Surface data 1)

| Surface number | r | d | nd | vd |
|---|---|---|---|---|
| Object surface | ∞ | Variable | | |
| 1 | 23.87850 | 4.30000 | 2.00069 | 25.5 |
| 2 | 127.86160 | 1.52650 | | |
| 3 | 183.86990 | 0.70000 | 1.51742 | 52.1 |
| 4 | 10.05570 | 7.32680 | | |
| 5 | −14.14930 | 2.77000 | 1.75211 | 25.0 |
| 6 | 22.42770 | 5.15000 | 1.72916 | 54.7 |
| 7 | −18.52000 | 0.60000 | | |
| 8 (Diaphragm) | ∞ | 1.70000 | | |
| 9 | 36.68800 | 5.50000 | 1.80420 | 46.5 |
| 10 | −51.79840 | Variable | | |
| 11* | 253.21040 | 2.50000 | 1.53380 | 55.6 |
| 12* | 22.11050 | Variable | | |
| 13* | 31.35910 | 6.50000 | 1.53380 | 55.6 |
| 14* | −20.34910 | 3.54720 | | |
| 15 | −30.62420 | 1.00000 | 1.58144 | 40.9 |
| 16 | −82.33480 | 10.80000 | | |
| 17 | ∞ | 4.20000 | 1.51680 | 64.2 |
| 18 | ∞ | 1.00000 | | |
| 19 | ∞ | BF | | |
| Image surface | ∞ | | | |

TABLE 23

(Surface data 2)

| Surface number | nC | nF | ng | PgF |
|---|---|---|---|---|
| Object surface | | | | |
| 1 | 1.98941 | 2.02872 | 2.05283 | 0.61349 |
| 2 | | | | |
| 3 | 1.51444 | 1.52436 | 1.52990 | 0.55883 |
| 4 | | | | |
| 5 | 1.74352 | 1.77355 | 1.79214 | 0.61909 |
| 6 | 1.72510 | 1.73844 | 1.74571 | 0.54521 |
| 7 | | | | |
| 8 | | | | |
| 9 | 1.79900 | 1.81630 | 1.82594 | 0.55785 |
| 10 | | | | |
| 11 | 1.53100 | 1.54060 | 1.54600 | 0.56232 |
| 12 | | | | |
| 13 | 1.53100 | 1.54060 | 1.54600 | 0.56232 |
| 14 | | | | |
| 15 | 1.57723 | 1.59145 | 1.59965 | 0.57667 |
| 16 | | | | |
| 17 | 1.51432 | 1.52237 | 1.52667 | 0.53418 |
| 18 | | | | |
| 19 | | | | |

TABLE 24

(Aspherical data)

Surface No. 11

K = 0.00000E+00, A4 = 1.61276E−05, A6 = −5.81668E−07,
A8 = −2.09502E−09
A10 = 7.71341E−10, A12 = −2.10800E−11, A14 = 2.38633E−13,
A16 = −1.00673E−15
Surface No. 12

K = 0.00000E+00, A4 = 1.81047E−05, A6 = 1.27838E−06,
A8 = −1.03829E−07
A10 = 3.56865E−09, A12 = −6.09424E−11, A14 = 5.06181E−13,
A16 = −1.58084E−15
Surface No. 13

K = 0.00000E+00, A4 = 1.78062E−05, A6 = 2.01697E−07,
A8 = −9.59188E−09
A10 = 2.58013E−10, A12 = −3.40082E−12, A14 = 2.22992E−14,
A16 = −5.27487E−17

TABLE 24-continued (Aspherical data)

Surface No. 14

K = 0.00000E+00, A4 = 4.87160E-05, A6 = -1.55628E-07, A8 = 3.63235E-09
A10 = -5.25127E-11, A12 = 9.47811E-13, A14 = -9.91324E-15, A16 = 4.47375E-17

TABLE 25

(Various data)

|  | Infinity | 1011 | 246 |
|---|---|---|---|
| Focal length | 25.8784 | 26.0073 | 26.0867 |
| F-number | 1.76012 | 1.79041 | 1.91463 |
| Viewing angle | 23.6324 | 23.1232 | 21.1160 |
| Image height | 10.8150 | 10.8150 | 10.8150 |
| Overall length of lens system | 71.0046 | 71.0088 | 71.0046 |
| BF | 0.00461 | 0.00488 | 0.00594 |
| d0 | ∞ | 939.5121 | 175.0000 |
| d10 | 2.3500 | 3.4869 | 8.6131 |
| d12 | 9.5295 | 8.3965 | 3.2651 |
| Entrance pupil position | 19.8824 | 19.8824 | 19.8824 |
| Exit pupil position | -64.2371 | -62.2690 | -53.0287 |
| Front principal point position | 35.3363 | 34.9025 | 32.1589 |
| Back principal point position | 45.1263 | 44.2883 | 41.1597 |

TABLE 26

(Single lens data)

| Lens | Initial surface | Focal length |
|---|---|---|
| 1 | 1 | 28.7470 |
| 2 | 3 | -20.5869 |
| 3 | 5 | -11.1722 |
| 4 | 6 | 14.6906 |
| 5 | 9 | 27.4664 |
| 6 | 11 | -45.5552 |
| 7 | 13 | 24.1767 |
| 8 | 15 | -84.4622 |

TABLE 27

(Lens unit data)

| Lens unit | Initial surface | Focal length | Overall length of lens unit | Front principal point position | Back principal point position |
|---|---|---|---|---|---|
| 1 | 1 | 30.51097 | 29.57330 | 26.42482 | 32.69836 |
| 2 | 11 | -45.55524 | 2.50000 | 1.79263 | 2.65653 |
| 3 | 13 | 31.31949 | 26.04720 | 0.86548 | 5.09828 |

TABLE 28

(Lens unit magnification)

| Lens unit | Initial surface | Infinity | 1011 | 246 |
|---|---|---|---|---|
| 1 | 1 | 0.00000 | -0.03262 | -0.17852 |
| 2 | 11 | 2.83624 | 2.81144 | 2.69906 |
| 3 | 13 | 0.29905 | 0.29904 | 0.29900 |

NUMERICAL EXAMPLE 5

The single focal length lens system according to Numerical Example 5 corresponds to the fifth exemplary embodiment illustrated in FIG. 9. Table 29 shows the surface data 1 of the single focal length lens system according to Numerical Example 5, Table 30 shows the surface data 2, Table 31 shows the aspherical data, Table 32 shows various data, Table 33 shows the single lens data, Table 34 shows the lens unit data, and Table 35 shows the lens unit magnification.

TABLE 29

(Surface data 1)

| Surface number | r | d | nd | vd |
|---|---|---|---|---|
| Object surface | ∞ | Variable | | |
| 1 | 24.71640 | 3.70750 | 1.94595 | 18.0 |
| 2 | 178.46780 | 1.84880 | | |
| 3 | -255.15060 | 0.70000 | 1.84666 | 23.8 |
| 4 | 11.73970 | 15.17090 | | |
| 5* | -273.46320 | 5.36000 | 1.53380 | 55.6 |
| 6* | -19.32630 | 1.03570 | | |
| 7 (Diaphragm) | ∞ | 1.46430 | | |
| 8 | 28.39560 | 4.14820 | 1.72916 | 54.7 |
| 9 | -89.34800 | Variable | | |
| 10* | 42.81990 | 2.35890 | 1.63550 | 23.9 |
| 11* | 10.59360 | Variable | | |
| 12 | 22.14210 | 5.91100 | 1.53380 | 55.6 |
| 13 | -24.38950 | 7.61930 | | |
| 14 | -14.84820 | 0.80000 | 1.51680 | 64.2 |
| 15 | -30.35070 | 10.43010 | | |
| 16 | ∞ | 4.20000 | 1.51680 | 64.2 |
| 17 | ∞ | BF | | |
| Image surface | ∞ | | | |

TABLE 30

(Surface data 2)

| Surface number | nC | nF | ng | PgF |
|---|---|---|---|---|
| Object surface | | | | |
| 1 | 1.93123 | 1.98383 | 2.01825 | 0.65443 |
| 2 | | | | |
| 3 | 1.83649 | 1.87209 | 1.89413 | 0.61908 |
| 4 | | | | |
| 5 | 1.53100 | 1.54060 | 1.54600 | 0.56232 |
| 6 | | | | |
| 7 | | | | |
| 8 | 1.72510 | 1.73844 | 1.74571 | 0.54521 |
| 9 | | | | |
| 10 | 1.62800 | 1.65460 | 1.67140 | 0.63158 |
| 11 | | | | |
| 12 | 1.53100 | 1.54060 | 1.54600 | 0.56232 |
| 13 | | | | |
| 14 | 1.51432 | 1.52237 | 1.52667 | 0.53418 |
| 15 | | | | |
| 16 | 1.51432 | 1.52237 | 1.52667 | 0.53418 |
| 17 | | | | |

TABLE 31

(Aspherical data)

Surface No. 5

K = -1.40898E+01, A4 = -4.06632E-05, A6 = 5.24314E-07,
A8 = -1.82351E-08
A10 = 2.58975E-10, A12 = -6.08695E-13, A14 = -1.20636E-14, A16 = 7.23165E-17

TABLE 31-continued (Aspherical data)

Surface No. 6

$K = -1.07472E+00$, $A4 = -3.07368E-05$, $A6 = -7.85089E-08$, $A8 = 2.97635E-10$
$A10 = -1.04537E-10$, $A12 = 2.75209E-12$, $A14 = -2.53195E-14$, $A16 = 8.30044E-17$

Surface No. 10

$K = 1.21551E+01$, $A4 = -2.15878E-04$, $A6 = 2.35425E-06$, $A8 = -2.98953E-08$
$A10 = 7.56047E-11$, $A12 = 5.37545E-12$, $A14 = -7.93906E-14$, $A16 = 3.37126E-16$

Surface No. 11

$K = -5.98312E-01$, $A4 = -2.46478E-04$, $A6 = 3.41000E-06$, $A8 = -3.62066E-08$
$A10 = -8.31722E-10$, $A12 = 3.90458E-11$, $A14 = -5.34728E-13$, $A16 = 2.51787E-15$

TABLE 32

(Various data)

|  | Infinity | 1014 | 255 |
|---|---|---|---|
| Focal length | 24.1502 | 24.0731 | 23.6389 |
| F-number | 1.78016 | 1.80136 | 1.88535 |
| Viewing angle | 24.1239 | 23.8739 | 22.9258 |
| Image height | 10.8150 | 10.8150 | 10.8150 |
| Overall length of lens system | 74.5756 | 74.5965 | 74.6096 |
| BF | 0.99270 | 1.01329 | 1.02616 |
| d0 | ∞ | 939.5121 | 180.0000 |
| d9 | 1.3821 | 1.7376 | 3.2117 |
| d11 | 7.4461 | 7.0909 | 5.6170 |
| Entrance pupil position | 20.6022 | 20.6022 | 20.6022 |
| Exit pupil position | -40.6406 | -40.3034 | -38.8601 |
| Front principal point position | 30.7436 | 30.4380 | 29.0865 |
| Back principal point position | 50.4254 | 49.9107 | 47.9575 |

TABLE 33

(Single lens data)

| Lens | Initial surface | Focal length |
|---|---|---|
| 1 | 1 | 29.9777 |
| 2 | 3 | -13.2400 |
| 3 | 5 | 38.6744 |
| 4 | 8 | 29.9969 |
| 5 | 10 | -22.7979 |
| 6 | 12 | 22.7474 |
| 7 | 14 | -57.2563 |

TABLE 34

(Lens unit data)

| Lens unit | Initial surface | Focal length | Overall length of lens unit | Front principal point position | Back principal point position |
|---|---|---|---|---|---|
| 1 | 1 | 18.63567 | 33.43540 | 27.15524 | 39.49239 |
| 2 | 10 | -22.79789 | 2.35890 | 1.97254 | 2.84690 |
| 3 | 12 | 29.78519 | 28.96040 | -2.87687 | 2.63961 |

TABLE 35

(Lens unit magnification)

| Lens unit | Initial surface | Infinity | 1014 | 255 |
|---|---|---|---|---|
| 1 | 1 | 0.00000 | -0.01966 | -0.09885 |
| 2 | 10 | 15.61636 | 15.73302 | 15.75216 |
| 3 | 12 | 0.08298 | 0.08229 | 0.08186 |

The following Table 36 shows the corresponding values to the individual conditions in the single focal length lens systems of each of Numerical Examples.

TABLE 36

| | Numerical Example | | | | |
|---|---|---|---|---|---|
| Condition | 1 | 2 | 3 | 4 | 5 |
| (1) $0.0018 \times vd_A + P_gF_A$ | 0.6726(L2) | 0.6856(L2) | 0.6746(L3) | 0.6641(L3) | 0.6726(L3) |
| (2) $0.0018 \times vd_B + P_gF_B$ | 0.6726(L5) | 0.6726(L5) | 0.6624(L5) | 0.6624(L7) | 0.6624(L6) |
| (3) $0.0018 \times vd_C + P_gF_C$ | 0.6746(L6) | 0.6641(L6) | 0.6746(L6) | 0.6624(L6) | 0.6746(L5) |
| (4) $(R1_B - R2_B) - (R1_B + R2_B)$ | 0.23(L5) | 0.16(L5) | 0.20(L5) | 0.21(L7) | -0.05(L6) |
| (5) $(R1_C + R2_C)/(R1_B - R2_C)$ | 0.84(L6) | 0.66(L6) | 0.72(L6) | 1.19(L6) | 1.66(L5) |
| (6) $|f_B/f_C|$ | -1.47(L5) | -0.82(L5) | -1.30(L5) | -0.53(L7) | -1.00(L6) |
| (7) $|f_W/f_D|$ | -1.42(L6) | -1.06(L6) | -1.31(L6) | -0.57(L6) | -1.06(L5) |

*Note 1:
The reference symbol of the lens element used is written in the parenthesis following each numerical value.

*Note 2:
The minimum value out of the corresponding lens elements is shown for conditions (1) to (3).

As presented above, the exemplary embodiments have been described above as illustrative examples of the technology in the present disclosure. The accompanying drawings and the detailed description are provided for this purpose.

Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The exemplary embodiments above are for illustrating the technology disclosed herein, and various changes, replacements, additions, and omissions can be made without departing from the scope defined by the claims and equivalents thereto.

What is claimed is;:

1. A single focal length lens system comprising, in order from an object side to an image side;
   a first lens unit having positive optical power; and
   a second lens unit including a lens element that moves in a direction of an optical axis with respect to an image surface in focusing from an infinity in-focus condition to a close-object in-focus condition,
   wherein the first lens unit includes an aperture diaphragm and a lens element A located on the object side of the aperture diaphragm,
   a lens element B having positive optical power and a lens element C having negative optical power are located on the image side of the aperture diaphragm, and
   the following conditions (1) to (3) are satisfied;

$$0.647 < P_g F_A + 0.0018 \times vd_A < 0.75 \quad (1)$$

$$0.647 < P_g F_B + 0.0018 \times vd_B < 0.75 \quad (2)$$

$$0.647 < P_g F_C + 0.0018 \times vd_C < 0.75 \quad (3)$$

where
   $vd_A$: an Abbe number of the lens element A to the d-line,
   $vd_B$: an Abbe number of the lens element B to the d-line,
   $vd_C$: an Abbe number of the lens element C to the d-line,
   $P_g F_A$: a partial dispersion ratio of the lens element A for the g-line and the F-line,
   $P_g F_B$: a partial dispersion ratio of the lens element B for the g-line and the F-line, and
   $P_g F_C$: a partial dispersion ratio of the lens element C for the g-line and the F-line.

2. The single focal length lens system according to claim 1, wherein the lens element B and the lens element C are disposed so as to be adjacent to each other in the direction of the optical axis.

3. The single focal length lens system according to claim 1, wherein the lens element B satisfies the following condition (4):

$$-0.5 < (R1_B + R2_B)/(R1_B - R2_B) < 1.0 \quad (4)$$

where
   $R1_B$: a radius of curvature of a surface of the lens element B at the object side, and
   $R2_B$: a radius of curvature of a surface of the lens element B at the image side.

4. The single focal length lens system according to claim 1, wherein the lens element C satisfies the following condition (5):

$$0.2 < (R1_C + R2_C)/(R1_C - R2_C) < 3.0 \quad (5)$$

where
   $R1_C$: a radius of curvature of a surface of the lens element C at the object side, and
   $R2_C$: a radius of curvature of a surface of the lens element C at the image side.

5. The single focal length lens system according to claim 1, wherein the lens element B and the lens element C satisfy the following condition (6):

$$0.3 < |f_B/f_C| < 2.5 \quad (6)$$

where
   $f_B$: a focal length of the lens element B, and
   $f_C$: a focal length of the lens element C.

6. The single focal length lens system according to claim 1,
   wherein the second lens unit includes one lens element D having negative optical power, and satisfies the following condition (7);

$$0.2 < |f_W/f_D| < 3.0 \quad (7)$$

where
   $f_W$: a focal length of an entire system in an infinity in-focus condition, and
   $f_D$: a focal length of the lens element D.

7. An interchangeable lens apparatus comprising;
   the single focal length lens system according to claim 1; and
   a lens mount section that is connectable to a camera body including an imaging device which receives an optical image formed by the single focal length lens system and converts the optical image into an electric image signal.

8. A camera system comprising;
   an interchangeable lens apparatus including the single focal length lens system according to claim 1; and
   a camera body that is detachably connected to the interchangeable lens apparatus through a camera mount section and includes an imaging device which receives an optical image formed by the single focal length lens system and converts the optical image into an electric image signal.

* * * * *